Dec. 30, 1930. W. F. STIMPSON ET AL 1,786,788
SCALE
Filed Aug. 9, 1926 2 Sheets-Sheet 1
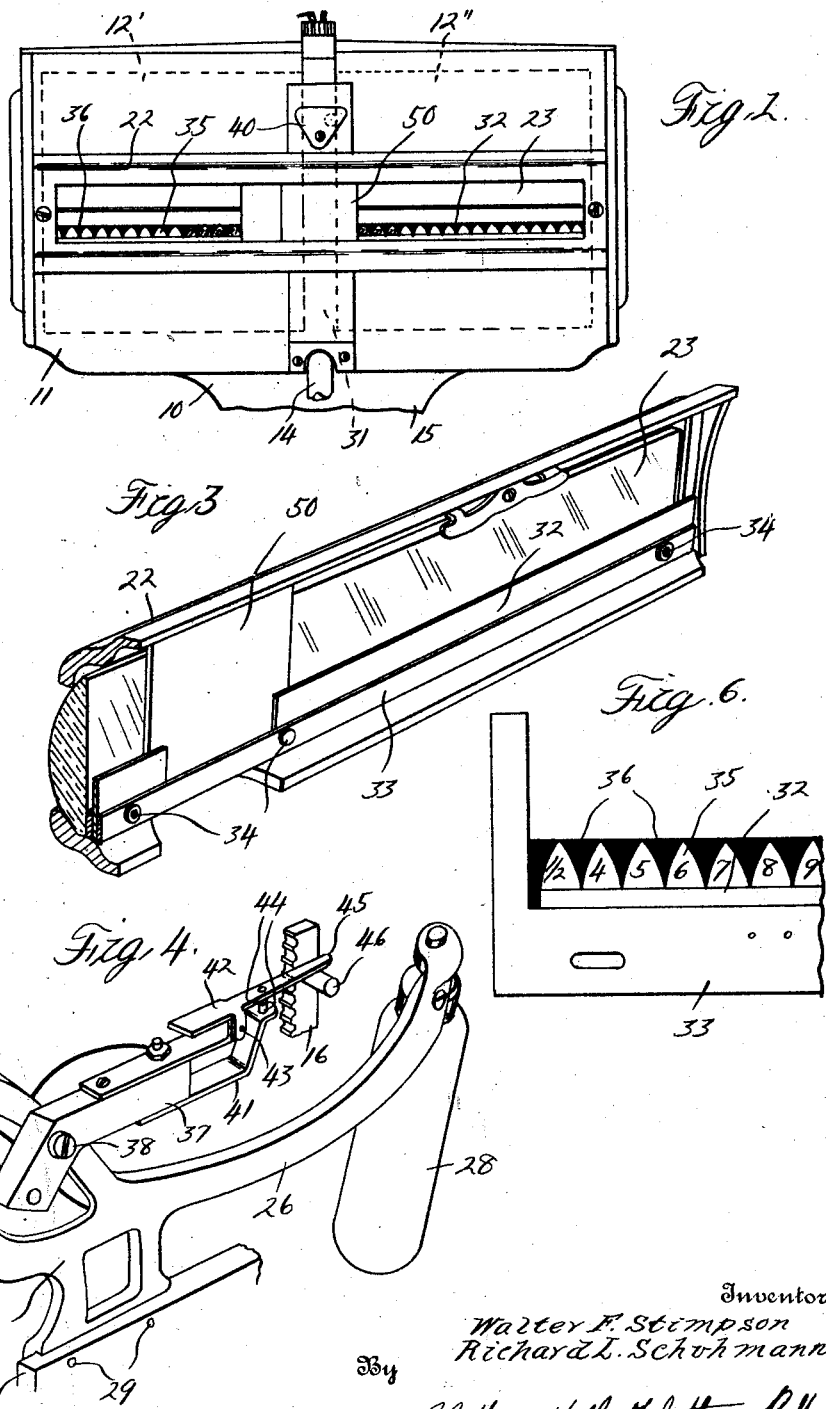

Dec. 30, 1930.     W. F. STIMPSON ET AL     1,786,788
SCALE
Filed Aug. 9, 1926     2 Sheets-Sheet 2
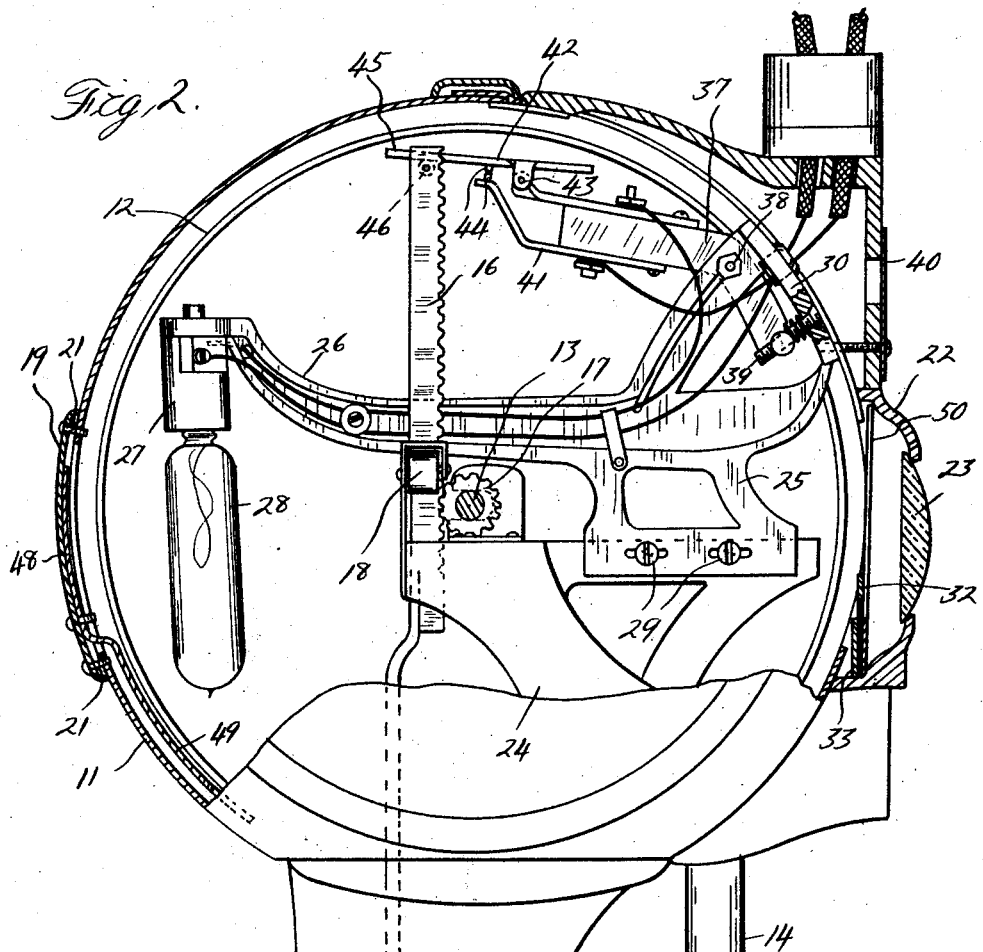
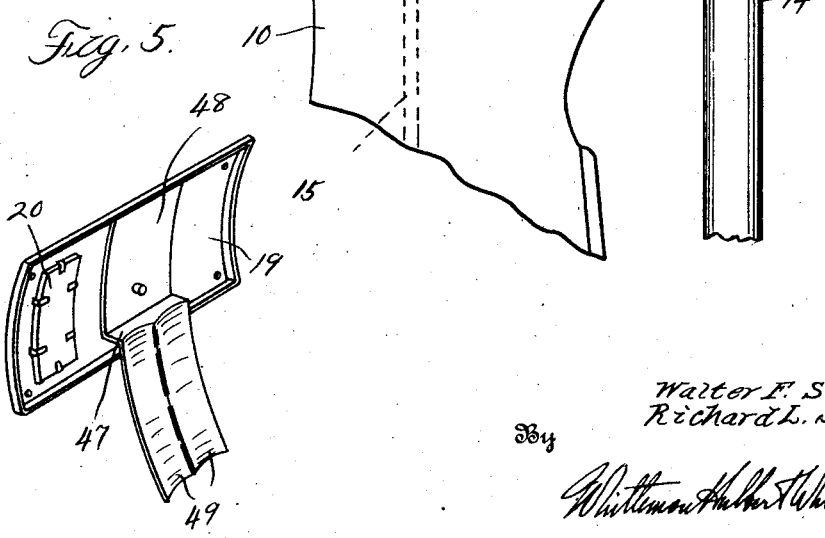
Inventors
Walter F. Stimpson
Richard L. Schuhmann
By
Attorneys Patented Dec. 30, 1930

1,786,788

UNITED STATES PATENT OFFICE

WALTER F. STIMPSON AND RICHARD L. SCHUHMANN, OF LOUISVILLE, KENTUCKY; SAID SCHUHMANN ASSIGNOR TO SAID STIMPSON

SCALE

Application filed August 9, 1926. Serial No. 128,258.

This invention relates to scales and more particularly to improvements therein having special reference to the illumination of the sight openings and the indicator drum.

The several objects, advantages and novel details of construction of the invention will be made more apparent as this description proceeds especially when considered in connection with the accompanying drawings wherein Figure 1 is a fragmentary front elevational view of the scale constructed in accordance with this invention.

Figure 2 is an enlarged vertical sectional view through that portion of the scale illustrated in Figure 1.

Figure 3 is a fragmentary perspective view of a portion of the scale structure.

Figure 4 is a fragmentary perspective view of another detail of construction.

Figure 5 is a fragmentary perspective view of one of the cover plates removed, and Figure 6 is a fragmentary elevational view of the indicator strip.

Referring now particularly to the drawings wherein like reference characters indicate like parts, it will be noted that there is illustrated a scale including a pedestal 10, a housing 11, an indicator cylinder or drum 12 and a shaft 13 by which said drum is rotatably mounted. The reference character 14 indicates the usual check rod and 15 the operating rod for the indicator drum which is connected at its lower end to the steelyard. The rod 15 is provided at its upper end with a rack 16 which meshes with the pinion 17 keyed to the shaft 13, anti-friction rollers 18 being provided for guidingly supporting the rack 16.

The housing 11 is formed with an opening closed by a cover plate 19 which is provided with a sight opening 20, the cover plate being secured to the housing by means of screws 21. The housing is also provided with another opening closed by a cover 22 provided with a sight opening 23.

The indicator drum 12 is preferably formed of two sections 12' and 12" spaced apart centrally of the housing 11, this drum being formed of a translucent material.

Mounted upon the stationary part of the housing such for instance as the bracket 24 is a supporting bracket 25 formed with an arm 26 carrying a socket 27 for electric light bulb 28. The supporting bracket 25 is secured to the part 24 as shown at 29 and also has a portion 30 arranged adjacent the surface of the housing 11. The electric light bulb 28 is positioned adjacent the rear sight opening 20 and in substantial alignment with the space 31 between the two drum sections 12' and 12". By this arrangement light from the electric light bulb 28 illuminates the rear sight opening 20 so as to render clearly visible to the customer that portion of the indicator drum 12 exposed at the sight opening 20.

It will be noted that the electric light bulb 28 is arranged substantially within the cylindrical drum 12.

Associated with the cover plate 22 which carries the front sight opening is an indicator strip 32 supported in a frame 33 which is secured as for instance by means of bolts 34 to the cover plate 22. This indicator strip has translucent portions 35 and non-transparent portions 36.

In operation when the electric light bulb 28 is illuminated the light will be projected through the indicator drum 12 at the sight opening 23 and through the translucent portions 35 of the indicator strip 32 thus not only illuminating the indicator drum but also the cooperating indicator strip 32. This indicator strip may for instance be provided with indicia designating the several columns of graduations contained on the indicator drum.

Mounted upon the bracket 25 is a supporting arm 37 pivotally supported as at 38 so as to be oscillatable by means of adjusting screw 39 accessible from the exterior of the housing 11 when a cover plate 40 is removed. The other end of the arm 37 supports a switch which includes a stationary contact arm 41 and a movable contact arm 42. The arm 42 is pivotally mounted as at 43 and moves by gravity to a position where the contacts 44 are in engagement. The end of the arm 42 is extended as indicated at 45 and is engaged by means of a stud roller 46 carried on the upper end of rack 16 for opening the switch when the rack 16 is in its upper position.

This is the position this rack assumes when the scale is at rest. Thus, the circuit to the electric light bulb 28 is broken when the scale is at rest but at the commencement of the weighing operation the rack 16 travels downwardly to permit the contacts 44 to close whereupon the circuit to the electric light bulb 28 is closed to illuminate the two sight openings. By means of the adjusting screw 39 the position of supporting arm 37 and consequently the position of the switch with reference to the end of rack 16 may be varied so as to cause a closing of the switch immediately upon the downward movement of the rack 16.

Arranged at one side of the electric light bulb 28 and preferably secured to the cover plate 19 is a reflector 47 formed with a flat reflector portion 48 and a pair of concave reflector portions 49. This reflector is designed to reflect the light from the electric light bulb 28 toward the sight opening 23 and to also distribute the rays longitudinally of the drum 12. As this light 28 is arranged adjacent the space 31 between the two drum sections, the light will pass between the drum sections and illuminate the rear sight opening 20. The frame 33 of the indicator strip 32 is formed with a screen portion 50 disposed substantially centrally of the front sight opening 23 to conceal the opening 31 between the two drum sections and to prevent the direct passage of the light through the sight opening 23.

From the foregoing it is obvious that upon the weighing operation the switch is closed and the circuit to the electric light bulb 28 completed. Rays of light will pass between the drum sections to illuminate the rear sight openings 20 and will be reflected forwardly toward the front sight openings 23 through the translucent drum 12 and through the translucent portions 35 of the cooperating indicator strip. Thus the front sight opening 23 is also illuminated and the reading of the indications on the drum 12 at both sight openings facilitated. The arrangement of the switch and its operating means is such that the light is illuminated only upon a weighing operation and the adjustable mounting for the switch affords means for accurate and fine adjustment of the switch with reference to its operating means.

While the embodiment of the invention herein illustrated and described somewhat in detail has been found in practice to render entirely satisfactory results nevertheless it will be apparent to those skilled in this art that various changes may be made in many of the details of this invention and to this end reservation is made to make such changes as may come within the purview of the accompanying claims.

What we claim as our invention is:

1. In a scale, a housing formed with a pair of sight openings, a drum indicator having translucent portions, an indicator strip located adjacent one of said sight openings and provided with translucent portions and a light arranged within said drum adjacent the other sight opening, for illuminating the drum at the sight openings and the translucent portions of said strip.

2. In a scale, a housing formed with front and rear sight openings, a cylindrical indicator of translucent material, a light within said indicator for illuminating the same at the sight openings and an indicator strip adjacent one sight opening provided with translucent portions illuminated by said light.

3. In a scale, a housing provided with a sight opening, an indicator drum of translucent material, a cooperating indicator strip arranged adjacent said sight opening provided with translucent portions, a source of illumination within said drum and a reflector for distributing the light longitudinally of the drum whereby said drum and the translucent portions of said strip are illuminated at said sight opening.

4. In a scale, a housing formed with a sight opening, an indicator drum of translucent material, said drum comprising two sections longitudinally spaced apart, an indicator strip adjacent said sight opening, a bracket carried by said housing and extending through said space into said drum and a light mounted on said bracket for illuminating said drum and indicator strip.

5. In a scale, a housing formed with opposed sight openings, an indicator drum, said drum comprising two sections longitudinally spaced apart, a bracket carried by said housing and projecting into said drum through said space, a light carried by said bracket and arranged adjacent one of said sight openings and means for reflecting said light to also illuminate the drum at the other sight opening.

In testimony whereof we affix our signatures.

WALTER F. STIMPSON.
RICHARD L. SCHUHMANN.